US010022920B2

(12) United States Patent
Safai et al.

(10) Patent No.: US 10,022,920 B2
(45) Date of Patent: Jul. 17, 2018

(54) COMPOSITE MATERIAL CUTTING SYSTEM AND METHOD UTILIZING A WEIGHT DISTRIBUTION MAP

(71) Applicant: The Boeing Company, Chicago, IL (US)

(72) Inventors: Morteza Safai, Newcastle, WA (US); Ronald G. Turner, Arlington, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 14/504,992

(22) Filed: Oct. 2, 2014

(65) Prior Publication Data

US 2016/0096355 A1    Apr. 7, 2016

(51) Int. Cl.
  *B32B 41/00*  (2006.01)
  *B29C 70/54*  (2006.01)
(52) U.S. Cl.
  CPC .................. *B29C 70/545* (2013.01)
(58) Field of Classification Search
  CPC ........ C02F 1/54; B29C 70/00; B32C 2605/18
  USPC .................. 156/64, 350, 351, 360, 378, 379
  See application file for complete search history.

(56) References Cited

U.S. PATENT DOCUMENTS

| | | | | | |
|---|---|---|---|---|---|
| 6,164,174 | A | * | 12/2000 | Sigurdsson | 83/13 |
| 6,826,989 | B1 | * | 12/2004 | Wattles | A22C 17/0093 83/102 |
| 2009/0082891 | A1 | * | 3/2009 | Tang | B29C 70/386 700/100 |

OTHER PUBLICATIONS

Application from U.S. Appl. No. 14/309,713, filed Jun. 19, 2014.

* cited by examiner

*Primary Examiner* — Michael N Orlando
*Assistant Examiner* — Joshel Rivera
(74) *Attorney, Agent, or Firm* — Alston & Bird LLP

(57) ABSTRACT

A system and method are provided to fabricate a composite part formed of a plurality of pieces of composite material in accordance with a predefined weight requirement. In the context of a system, a source of electromagnetic signals configured to impinge upon a supply of composite material is provided. The system also includes a detector to capture the electromagnetic signals following propagation through the supply of composite material during which at least some of the electromagnetic signals are absorbed by the composite material in a manner proportional to the density of the composite material. The system further includes a computing system to generate a weight distribution map of the supply of composite material based upon the electromagnetic signals captured following propagation through the supply. The weight of a plurality of pieces of composite material cut from the supply of composite material and combined into a composite part is determinable.

20 Claims, 7 Drawing Sheets

COMPOSITE MATERIAL CUTTING SYSTEM AND METHOD UTILIZING A WEIGHT DISTRIBUTION MAP

TECHNOLOGICAL FIELD

An example embodiment of the present disclosure is directed to a system and method for cutting of pieces of composite material from a supply of composite material and the subsequent combination of the pieces of composite material into a composite part and, more particularly, to a system and method for generating and utilizing a weight distribution map of the supply of composite material in conjunction with the cutting of the pieces of composite material from the supply and the combination of the pieces of composite material into a composite part.

BACKGROUND

Some composite parts are fabricated by combining a plurality of pieces of composite material with the pieces of composite material being subjected to a combination of heat and pressure in order to consolidate the pieces of composite material into an integral composite part. For example, some composite parts utilized by aircraft, such as the window trim of aircraft, may be fabricated from a plurality of pieces of composite material that are combined into an integral composite part.

By way of example, the plurality of pieces of composite material that are combined to form the window trim of an aircraft may be cut from a supply of composite material. In this regard, a sheet of composite material, such as may be provided in the form of a roll, may be provided to a cutter, such as by advancing the sheet of composite material along a conveyer system. The cutter may then cut pieces of composite material from the sheet of composite material. These pieces of composite material need not have the same size and shape as the resulting composite part, but may be smaller and differently shaped, such as smaller rectangular pieces of composite material. The pieces of composite material may then be placed in a form, such as a tray, having the shape of the resulting composite part prior to consolidation.

Composite parts often times are required to be fabricated to within relatively precise weight requirements, such as to provide the desired structural integrity and strength without unnecessarily adding to the weight of the assembled structure. Thus, the plurality of pieces that are placed in the tray may be weighed. In an instance in which the plurality of pieces of composite material do not weigh enough, such as by failing to satisfy a minimum weight requirement of the resulting composite part, one or more additional pieces of composite material may be added to the tray and the plurality of pieces of composite material may again be weighed. This process may be repeated until the plurality of pieces of composite material placed within the tray satisfy the predefined weight requirements of the resulting composite part. Alternatively, in an instance in which the plurality of pieces of composite material placed within the tray exceed the maximum weight requirement of the resulting composite part, one or more pieces of composite material may be removed from the tray and the plurality of pieces of composite material that remain within the tray may then again be weighed. As before, this process may be repeated until the plurality of pieces of composite material that remain within the tray satisfy the predefined weight requirements of the resulting composite part.

Once the plurality of pieces of composite material within the tray satisfy the predefined weight requirement, the plurality of pieces of composite material may be subjected to a combination of heat and pressure in order to consolidate the plurality of pieces of composite material, thereby forming the resulting composite part. However, the process of weighing the plurality of pieces of composite material within the tray and then adding or removing pieces of composite material prior to again weighing the plurality of pieces of composite material within the tray in an effort to satisfy the predefined weight requirements of the resulting composite part may be time consuming and may reduce the efficiency and increase the costs associated with the manufacture of the composite part.

BRIEF SUMMARY

A system and method are provided in accordance with an example embodiment of the present disclosure to facilitate the fabrication of a composite part in accordance with a predefined weight requirement in a manner that may be performed more quickly and efficiently. In this regard, the system and method of an example embodiment may determine the weight of the pieces of composite material in advance based upon a weight distribution map of the supply of composite material. Thus, the plurality of pieces of composite material may be selected for combination in a manner that takes into account the weight of the pieces of composite material prior to placement in a tray or other form for consolidation into the resulting composite part. Thus, the system and method of an example embodiment may avoid the time consumed by prior processes that required that the plurality of pieces of composite material that have been placed in the tray be weighed with pieces of composite material then being added or removed in an effort to satisfy the predefined weight requirement prior to again weighing the plurality of pieces of composite material that have been placed in the tray and then repeating the process, if necessary.

In an example embodiment, a method is provided that includes generating a weight distribution map of a supply of composite material. The method of this example embodiment also includes cutting a plurality of pieces of composite material from the supply with a weight of each piece determined based upon the weight distribution map. The method of this example embodiment also determines the plurality of pieces of composite material to be combined to form a composite part based upon the weight of each of the plurality of pieces of composite material. As such, the weight of the composite part that results will satisfy a predefined weight requirement.

The method may generate the weight distribution map, such as a multi-dimensional weight distribution map, by determining a density of different portions of the supply of composite material and converting the density of the supply of composite material to a weight of different portions of the supply of composite material. In this regard, the method may determine the density by exposing the supply of composite material to electromagnetic signals. The method of this example embodiment may also capture the electromagnetic signals following propagation through the supply of composite material during which at least some of the electromagnetic signals are absorbed by the composite material in a manner proportional to the density of the composite material. In this example embodiment, the method also includes determining the density of the different portions of the supply of composite material based upon the electromagnetic signals captured following propagation through the supply of composite material.

The method may define the plurality of pieces of composite material to be cut from the supply based upon the weight distribution map and the predefined weight requirement of the composite part into which the plurality of pieces of composite material will be combined. Additionally or alternatively, the method of an example embodiment may include sorting the plurality of pieces of composite material into groups based upon the weight of the pieces. In this example embodiment, the method may determine the plurality of pieces of composite material to be combined to form the composite part by selecting the plurality of pieces from one or more groups such that the weight of the composite part satisfies the predefined weight requirement.

In another example embodiment, a system for cutting pieces of composite material from a supply of composite material includes a source of electromagnetic signals configured to impinge upon the supply of composite material. A system of this example embodiment also includes a detector configured to capture the electromagnetic signals following propagation through the supply of composite material during which at least some of the electromagnetic signals are absorbed by the composite material in a manner proportional to the density of the composite material. The system of this example embodiment also includes a computing system configured to generate a weight distribution map, such as a multi-dimensional weight distribution map, of the supply of composite material based upon the electromagnetic signals captured following propagation through the supply of composite material. As such, a weight of each of a plurality of pieces of composite material cut from the supply of composite material and combined into a composite part is determinable.

The computing system of an example embodiment may be configured to generate the weight distribution map by receiving signals representative of a density of different portions of the supply of composite material and by converting the density of the supply of composite material to the weight of different portions of the supply of composite material. The computing system of an example embodiment may be further configured to define the pieces of composite material to be cut from the supply based upon the weight distribution map and a predefined weight requirement of the composite part into which the plurality of pieces of composite material will be combined. Additionally or alternatively, the computing system of an example embodiment may be configured to determine the weight of each piece of composite material cut from the supply such that the plurality of pieces of composite material are sortable into groups based upon the weight of the pieces.

The source of electromagnetic signals may include a source of x-ray signals configured to generate a two-dimensional x-ray fan beam and a filter configurable to narrow the energy are an energy spectrum of the x-ray fan beam prior to impingement upon the supply of composite material. In an example embodiment in which the electromagnetic signals are x-ray signals, the detector may include an x-ray scintillator configured to receive x-ray signals following propagation through the supply of composite material and to generate corresponding light signals. The detector of this example embodiment also includes a charge couple device linear detector configured to receive the light signals from the x-ray scintillator and to provide corresponding signals to the computing system representative of the density of different portions of the supply of composite material.

In a further example embodiment, a system for cutting pieces of composite material from a supply of composite material is provided that includes a conveyor configured to advance the supply of composite material. The system also includes a source of x-ray signals configured to impinge upon the supply of composite material as the supply is advanced by the conveyor. The system further includes a detector configured to capture the x-rays signals following propagation through the supply of composite material during which at least some of the x-ray signals are absorbed by the composite material in a manner proportional to the density of the composite material. The system of this example embodiment also includes a computing system configured to generate a weight distribution map, such as a two-dimensional weight distribution map, of the supply of composite material based upon the x-ray signals captured by the detector. Further, the system of this example embodiment includes a cutter configured to cut pieces of composite material from the supply of composite material for subsequent combination into a composite part having a weight that satisfies a predefined weight requirement.

The computing system of an example embodiment may be configured to generate the weight distribution map by receiving signals representative of a density of different portions of the supply of composite material and by converting the density of the supply of composite material to the weight of different portions of the supply of composite material. The computing system of an example embodiment may also be configured to define the pieces of composite material to be cut from the supply based upon the weight distribution map and the predefined weight requirement of the composite part into which the pieces of composite material will be combined. In this example embodiment, the cutter is responsive to the computing system so as to cut the pieces of composite material from the supply of composite material in a manner defined by the computing system. Additionally or alternatively, the computing system of an example embodiment may be configured to determine the weight to each piece of composite material cut from the supply of composite material by the cutter such that the plurality of pieces of composite material are sortable into groups based upon the weight of the pieces.

A source of the x-ray signals may be configured to generate a two-dimensional x-ray fan beam. In this example embodiment, the system may further include a filter configured to narrow an energy spectrum of the x-ray fan beam prior to impingement upon the supply of composite material. The detector of an example embodiment may include an x-ray scintillator configured to receive x-ray signals following propagation through the supply of composite material and to generate corresponding light signals. The detector of this example embodiment may also include a charged coupled device linear detector configured to receive the light signals from the x-ray scintillator and to provide corresponding signals to the computing system representative of the density of different portions of the supply of composite material.

BRIEF DESCRIPTION OF THE DRAWINGS

Figure 1:
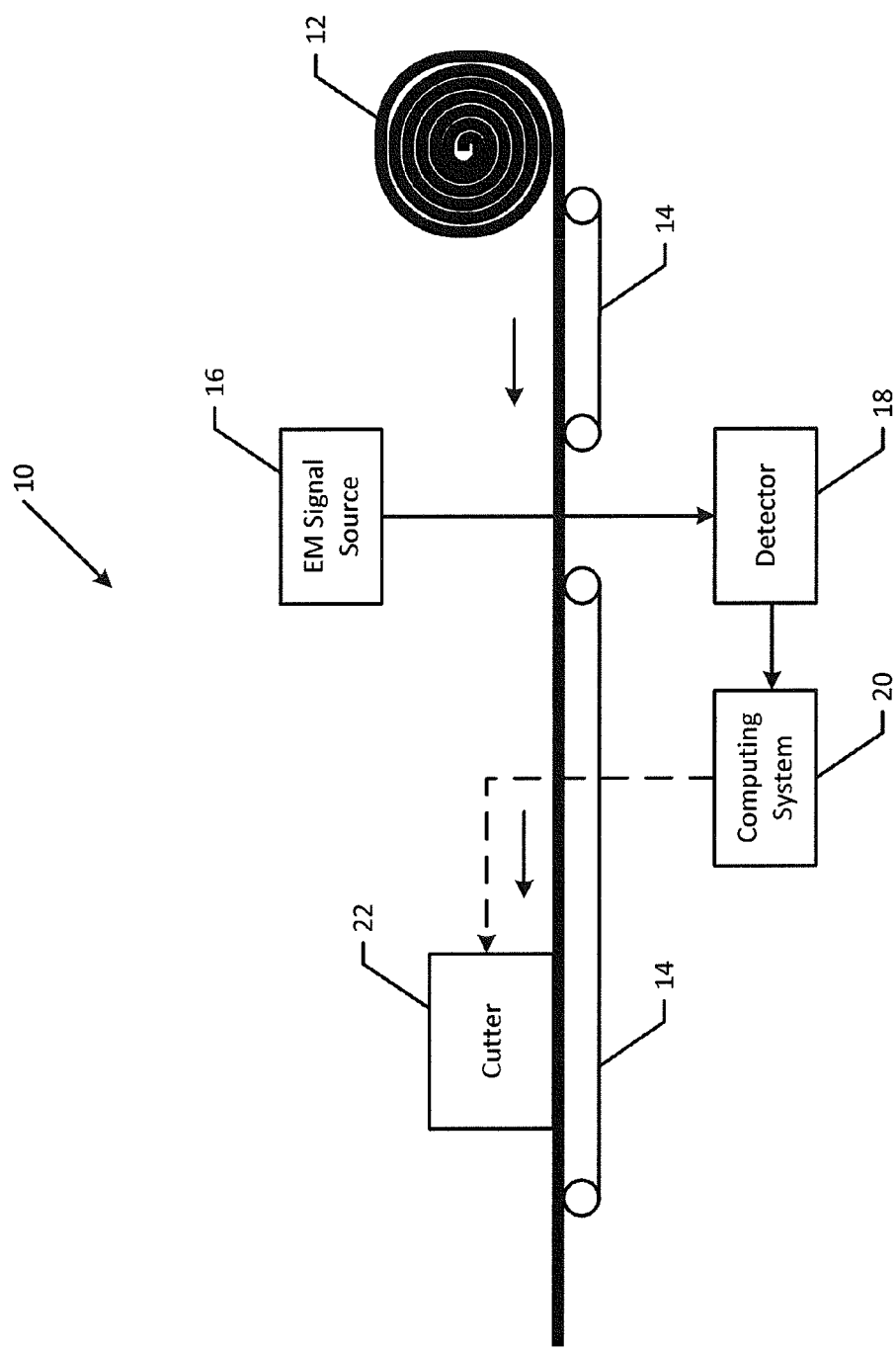
Figure 2:
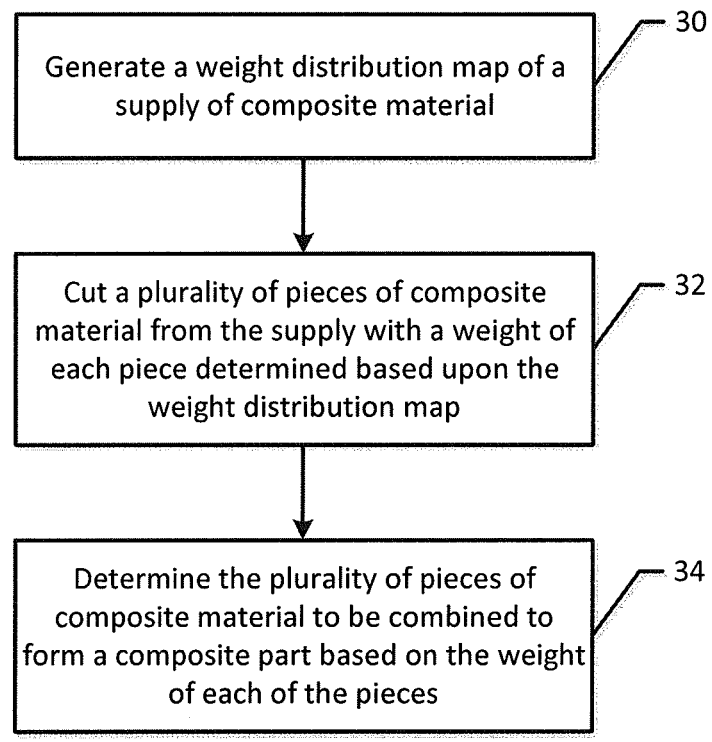
Figure 3:
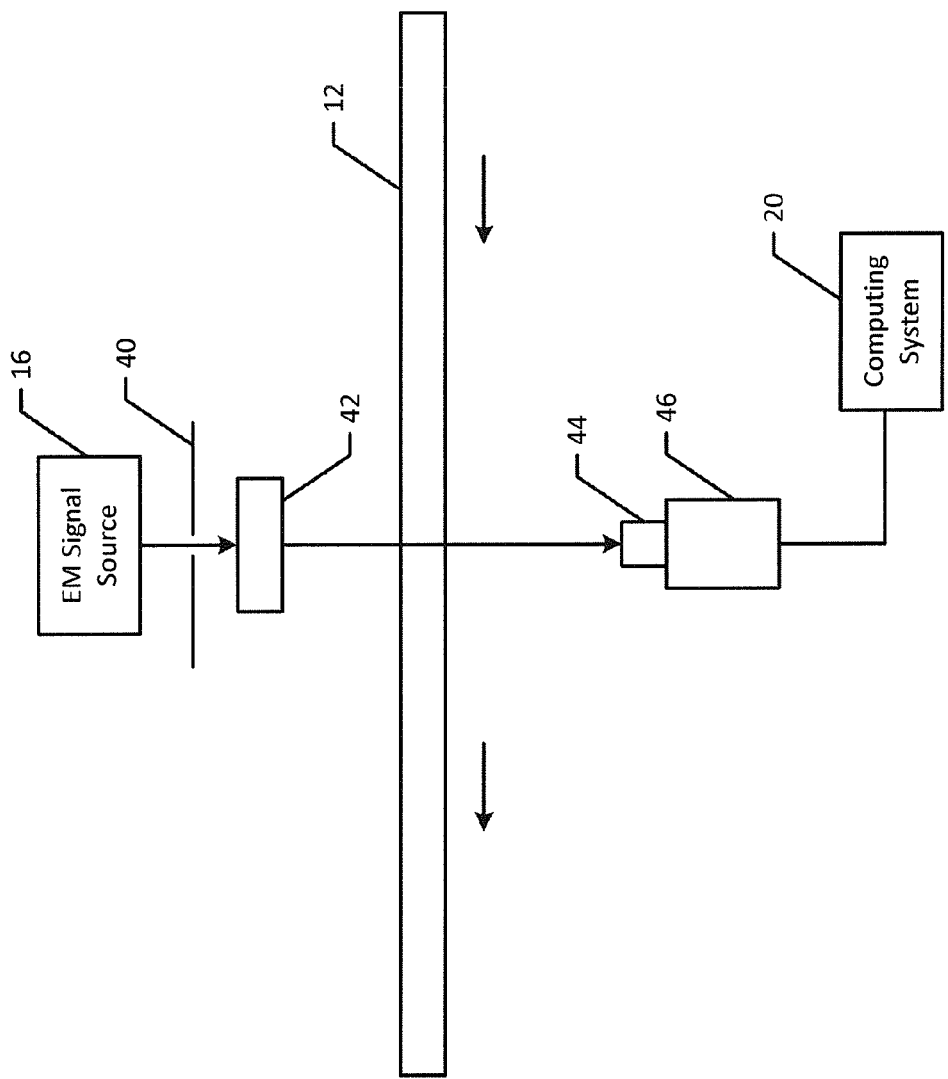
Figure 4:
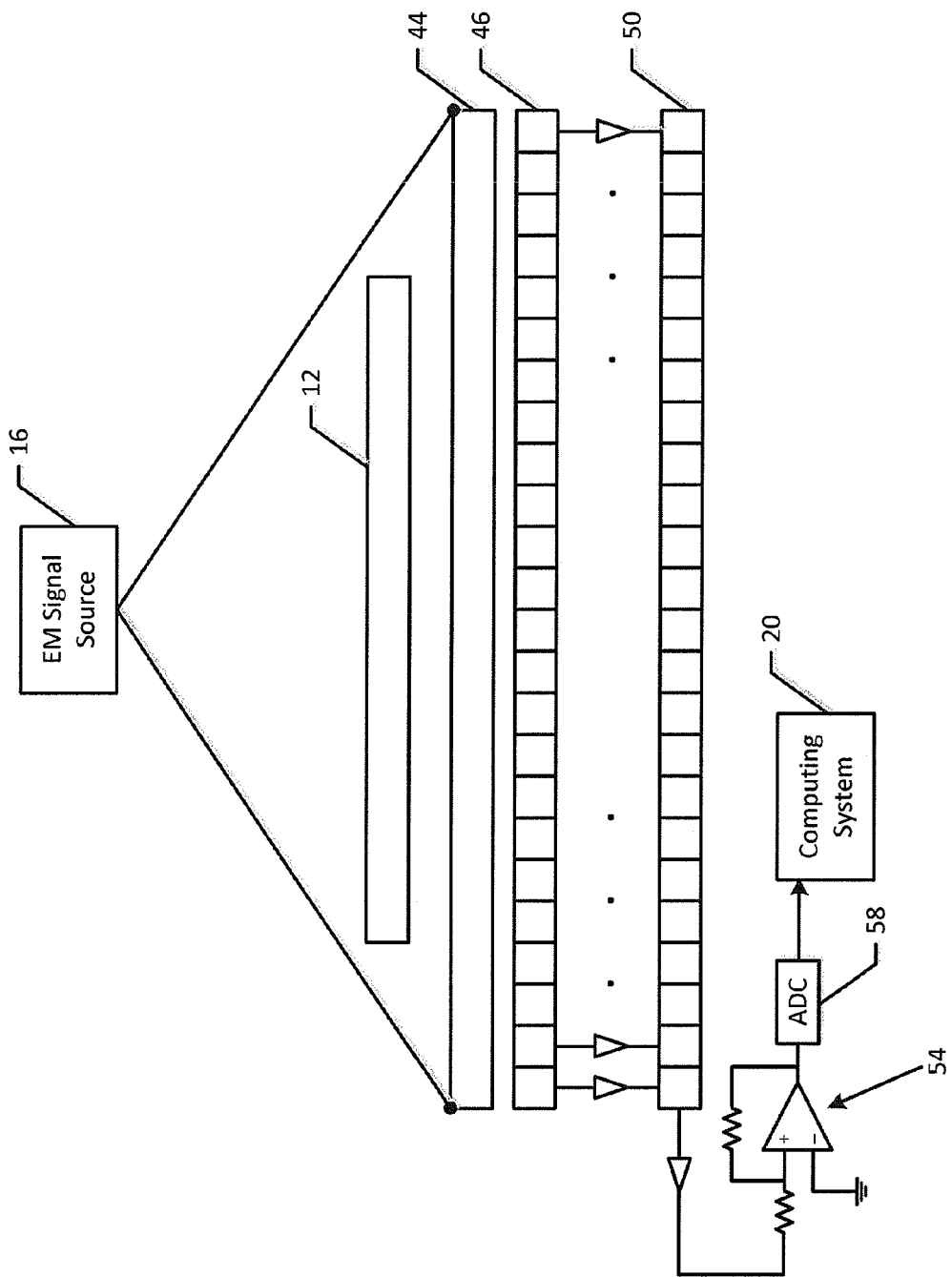
Figure 5:
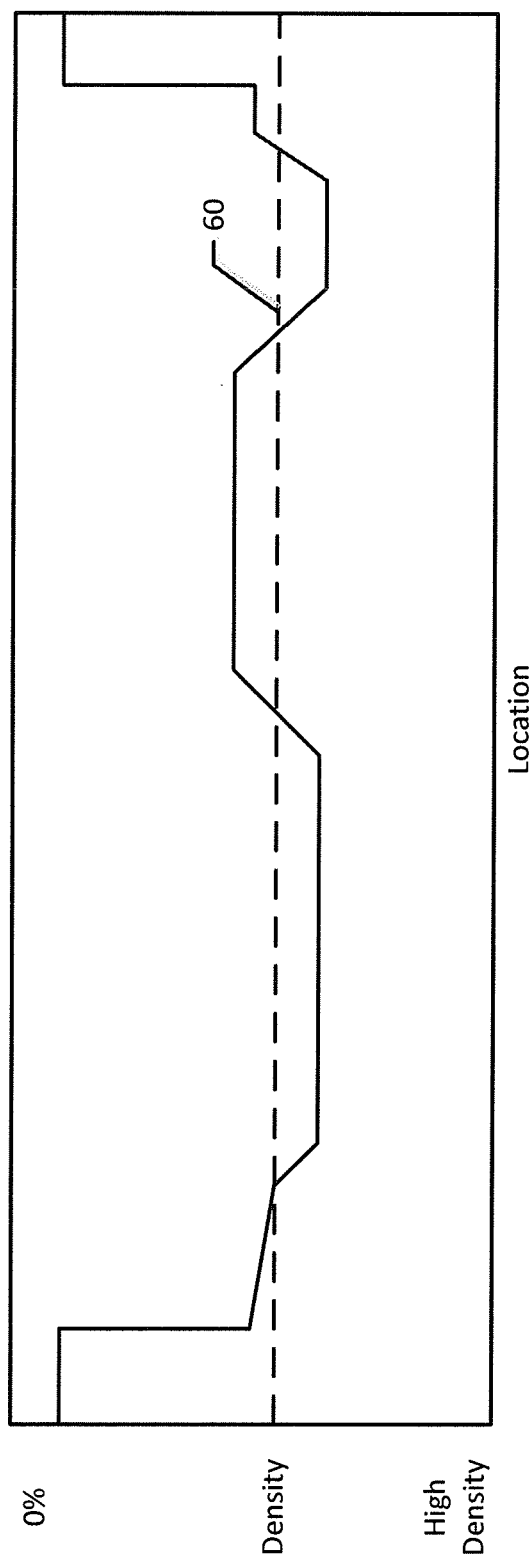
Figure 6:
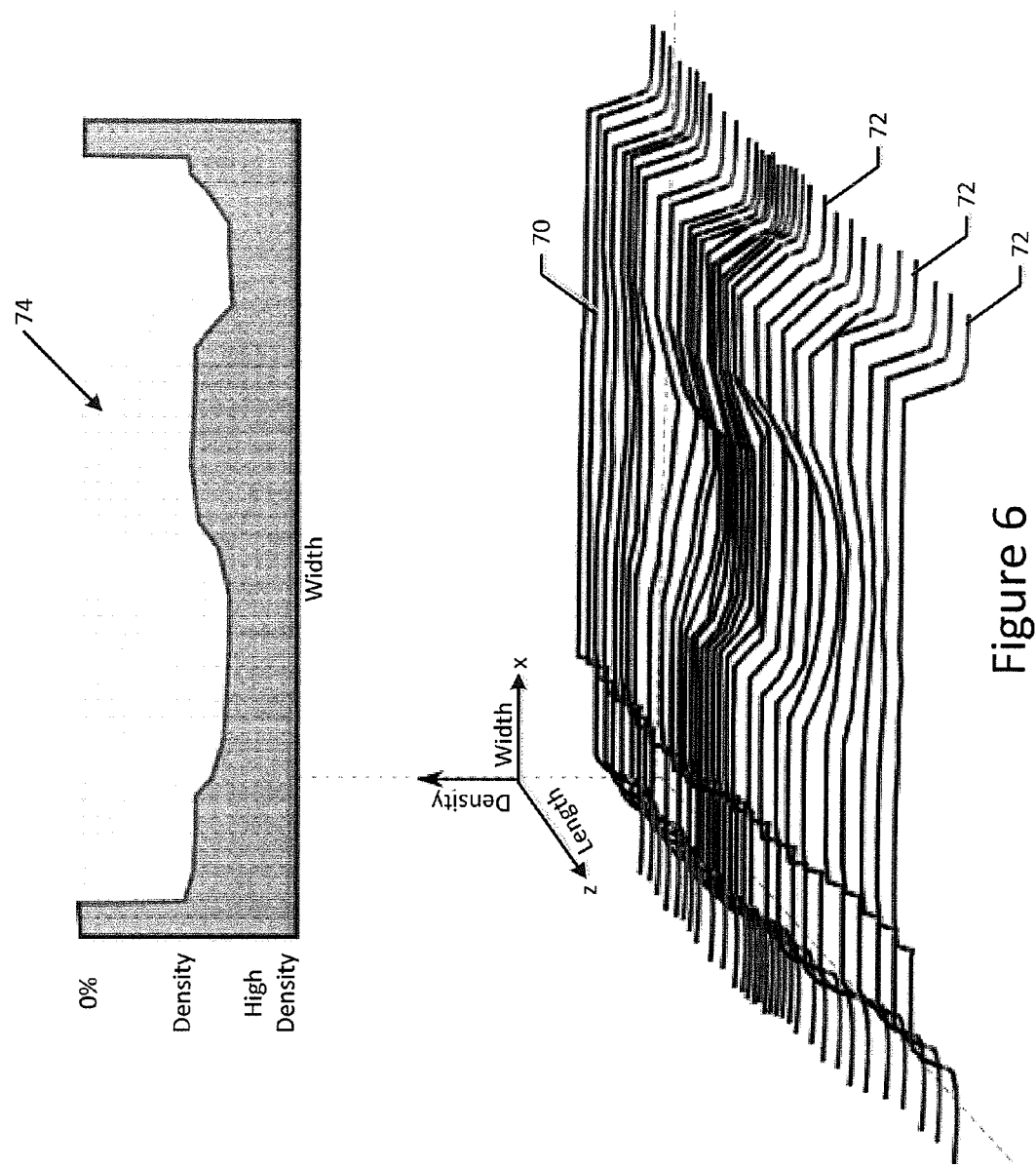
Figure 7:
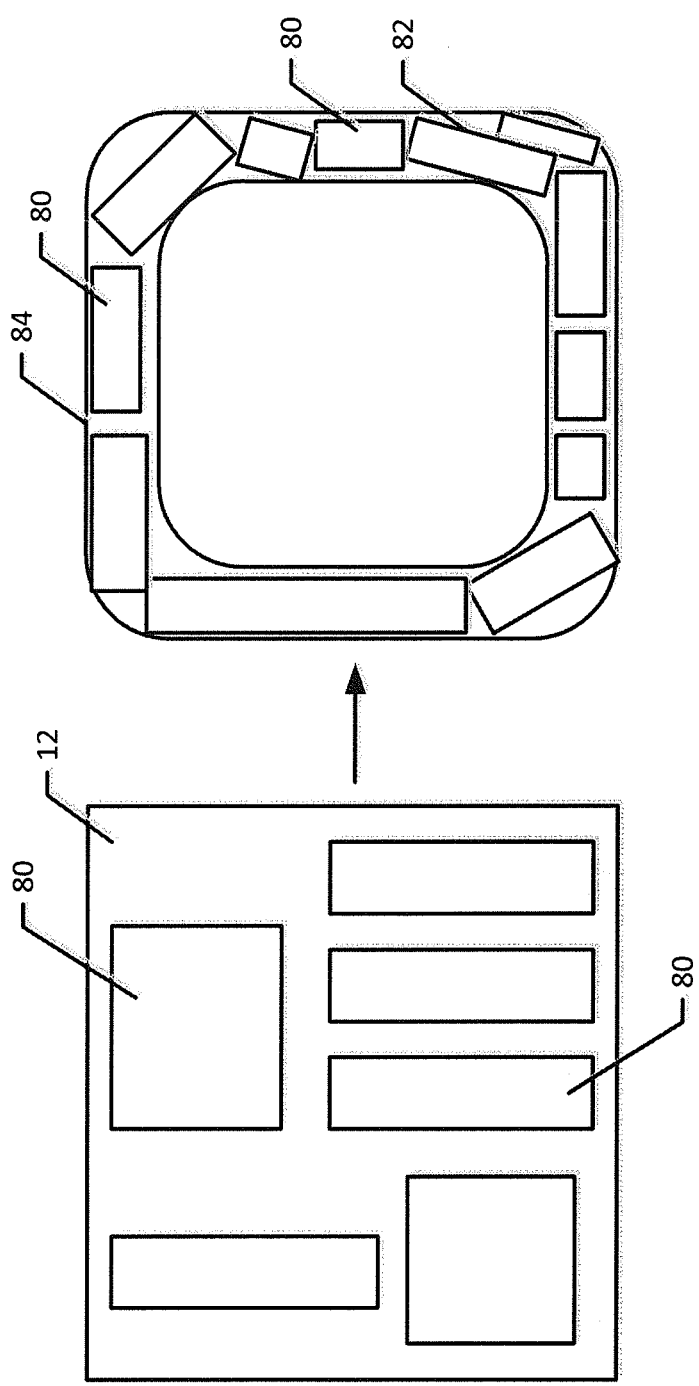

Having thus described aspects of the present disclosure in general terms, reference will now be made to the accompanying drawings, which are not necessarily drawn to scale, and wherein:

FIG. 1 is a side view of a system for cutting a plurality of pieces of composite material from a supply of composite material advanced along a conveyor in accordance with an example embodiment of the present disclosure;

FIG. 2 is a block diagram illustrating operations performed in accordance with an example embodiment of the present disclosure;

FIG. 3 is a side view of the electromagnetic signal source and the detector positioned in alignment on opposite sides of the composite material in accordance with an example embodiment of the present disclosure;

FIG. 4 is an illustration of the electromagnetic signals that impinge upon the supply of composite material and that are captured following propagation therethrough and from which the density of different portions of the supply of composite material may be determined in accordance with an example embodiment of the present disclosure;

FIG. 5 is a graphical representation of the density of a section of composite material taken across a width of the supply of composite material that may be utilized in determining the weight of the pieces of composite material to be cut from the supply of composite material in accordance with an example embodiment of the present disclosure;

FIG. 6 is a three-dimensional graphical representation of the density of a supply of composite material that illustrates variations in both the lengthwise (z) direction and the widthwise (x) direction, as well as the two-dimensional graphical representation of the density of the composite material taken across the width of the supply of composite material at a respective location along the length of the composite material that may be utilized in determining the weight of the pieces of composite material to be cut from the supply of composite material in accordance with an example embodiment of the present disclosure; and FIG. 7 is a representation of a plurality of pieces cut from the composite material and combined to form a composite part in accordance with an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A system and method are provided for cutting a plurality of pieces of composite material from a supply of composite material with the weight of the plurality of pieces being determinable in accordance with a weight distribution map of the supply of composite material. As such, the plurality of pieces of composite material may be combined in a manner such that the resulting composite part has a weight that satisfies a predefined weight requirement. In this regard, the plurality of pieces of composite material may be combined in an efficient manner by taking into account the weight of the plurality of pieces of composite material in advance in regards to the selection of the plurality of pieces of composite material for inclusion in a respective composite part.

Referring now to FIG. 1, a system 10 for cutting a plurality of pieces of composite material from the supply 12 of composite material is depicted. The composite material may be any of a variety of different types of composite material, but is generally comprised of a plurality of fibers, such as carbon fibers, glass fibers or the like, embedded within a resin, a matrix or the like. The supply of composite material may be provided in various manners. In the illustrated example, however, the supply of composite materials is provided in the form of a roll of composite material from which a sheet of composite material may be drawn. In this regard, the system may include a conveyor 14 for supporting and advancing the sheet of composite material drawn from the supply of composite material in a predefined direction, such as from the right to the left in the orientation depicted in the example of FIG. 1. Various types of conveyors may be utilized. In an example embodiment, however, the conveyor is embodied as a belt conveyor system.

The composite material typically has a density and, as such, a weight that varies there throughout. For example, the density of the composite material may vary in a lengthwise direction in which the conveyor 14 advances the sheet of composite material, such as from the right to the left in the orientation of FIG. 1, as well as in a widthwise direction, perpendicular to the direction in which the conveyor advances the sheet of composite material, such as into and out of the page of the orientation of FIG. 1. The density of the composite material may vary for a variety of reasons including localized differences in the ratio of fibers to resin, localized differences in the density of the constituent fibers or the resin or the like. Regardless of the reason for which the density of the composite material varies, the difference in the density of the composite material may cause the weight of the pieces of composite material cut from the supply 12 of composite material to similarly vary and, correspondingly, cause the weight of the resulting composite part formed by the combination of the plurality of pieces of composite material cut from the supply of composite material to vary, sometimes unacceptably.

In order to determine the weight of each piece of composite material cut from the supply 12 of composite material without separately weighing each piece of composite material and correspondingly slowing the fabrication process, the system 10 and method of an example embodiment may generate a weight distribution map 70 of the supply 12 of composite material such that the density and, in turn, the weight of the plurality of pieces of composite material cut from supply of composite material are determinable. See block 30 of FIG. 2. In order to generate the weight distribution map, the supply of composite material is subjected to electromagnetic signals that impinge thereupon and that are partially absorbed by the composite material in a manner proportional to the density of the composite material. Thus, by capturing the electromagnetic signals that are not absorbed and that propagate through the composite material, the density of the composite material may be determined.

As shown in FIG. 1, the electromagnetic signals may impinge upon the supply 12 of composite material at a location upstream, in terms of the lengthwise direction in which the supply of composite material is advanced by the conveyor 14, of a cutter 22, such as a flat bed cutter, that cuts the plurality of pieces from the supply of composite material. As shown in FIG. 1 and in more detail in FIG. 3, the system 10 may include a source 16 of electromagnetic signals. Although the system may employ a variety of electromagnetic signals, the electromagnetic signals of an example embodiment are x-ray signals generated by an x-ray source. The source of electromagnetic signals may, in an example embodiment, generate a fan-shaped beam of electromagnetic signals. For example, the source may include or define a slit 40 through which the electromagnetic signals pass in order to form a fan-shaped beam of electromagnetic signals. The source of electromagnetic signals may be positioned relative to the supply of composite materials such that the fan-shaped beam of electromagnetic signals extends in a widthwise direction and fully extends from one side of the sheet of composite material to the other side of the sheet of composite material.

The electromagnetic signals generated by the source 16 may not be coherent, but may, instead, include signals having a range of frequencies. In an example embodiment, the source 16 of electromagnetic signals may therefore also include a filter 42 for selectively filtering the electromagnetic signals such that the electromagnetic signals that subsequently impinge upon the sheet of composite material have an energy within a predefined spectrum. In this regard, the predefined energy spectrum may be a spectrum of energy that is preferentially absorbed by the composite material, such as electromagnetic signals having a relatively low energy, such as 45 keV to 60 keV.

As shown in FIGS. 1 and 3, the electromagnetic signals impinge upon the supply 12 of composite material. The system 10 of this example embodiment may also include a detector 18 configured to capture the electromagnetic signals that have propagated through the supply of composite material. As such, the detector may be positioned on the opposite side of the composite material relative to the source 16 of electromagnetic signals. In an embodiment in which the source of electromagnetic signals is configured to generate x-ray signals, the detector may be an x-ray detector.

As shown in FIG. 1, the conveyor 14 may define a gap or opening across which the supply 12 of composite material advances. In the illustrated embodiment, the source 16 of electromagnetic signals and the detector 18 may be configured to cause the electromagnetic signals to impinge upon that portion of the composite material that bridges the gap defined by the conveyor such that the conveyor does not impact the electromagnetic signals captured by the detector. However, the source of electromagnetic signals and the detector may be configured to operate through the conveyor such that the electromagnetic signals that are captured by the detector not only have propagated through the composite material, but also the conveyor system. In this regard, the system may be calibrated to take into account the portion, if any, of the electromagnetic signals absorbed by the conveyor such that the electromagnetic signals subsequently captured by the detector are analyzed in a manner that is representative of the density of the composite material through which the electromagnetic signals have propagated.

The detector 18 may be configured in various manners. In an example embodiment depicted in FIG. 3, however, the detector includes a scintillator 44, such as an x-ray scintillator, configured to receive the electromagnetic signals following propagation through the supply of composite material and to generate corresponding light signals. In this regard, the energy level of the light signals generated by the scintillator is proportional to the energy level of the electromagnetic signals received by the scintillator. The light signals generated by the scintillator may then be captured. For example, the detector may also include a charged coupled device (CCD) linear detector 46 configured to receive the light signals from the scintillator and to provide corresponding electrical signals representative of the density of the different portions of the supply of composite material.

In this regard, the detector 18 may include a plurality of elements, such as pixels, arranged in a plurality of rows and a plurality of columns such that each element, e.g., each pixel is associated with a respective portion of the composite material that has been irradiated by the electromagnetic signals. In an example embodiment depicted in FIG. 4 in which the composite material is irradiated by a two-dimensional fan beam that extends in a widthwise direction across the sheet 12 of composite material, the detector, such as the CCD linear detector 46, may include a plurality of elements, e.g., pixels, arranged in the widthwise direction such that each element is associated with a respective portion of the composite material. Thus, the signals provided by the CCD linear detector are the signals provided by each of the respective elements or pixels within the CCD linear detector and each signal represents the density of the portion of the composite material aligned with, such as overlying, the respective element or pixel.

The output of the detector 18 may be read in various manners. In the illustrated example, however, the detector may also include a data transfer channel 50. The data transfer channel may include a plurality of elements, each of which is associated with a respective element of the CCD linear detector 46. In this regard, the output of each element of the CCD linear detector may be provided to and captured by a respective element of the data transfer channel. The data transfer channel may, in turn, be read by sequentially shifting the elements, such as from the right to the left in the embodiment of FIG. 4, with the signal output by the leftmost element of the data transfer channel at a respective point in time representative of the signals captured following propagation through a respective portion of the composite material.

The signals provided by the detector 18, such as the signals provided by the data transfer channel 50, representative of the density of the respective portions of the supply 12 of composite material may be provided to a computing system 20. In an example embodiment, the signals provided by the detector may initially be provided to an amplifier 54 to condition the signals for receipt and analysis by the computing system. In the example depicted in FIG. 4, for example, the output of the amplifier may also be received by an analog-to-digital converter (ADC) 56 to generate corresponding digital signals for the computing system.

The computing system 20 may be configured to generate a weight distribution map of the supply 12 of composite material based upon the signals captured by the detector 18 following propagation through the different portions of the composite material. Although the computing system may be configured in a variety of different manners, the computing system may be embodied by a controller, a server, a personal computer, a tablet computer or the like. However, other types of computing systems may embody the method and computer program product of an embodiment of the present disclosure.

Regardless of the instantiation of the computing system 20, the computing system may be configured in various manners. By way of example, the computing system of one embodiment may include or otherwise be associated with a processing circuitry and memory for performing the various functions herein described. The processing circuitry may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry is configured to execute instructions stored in the memory or otherwise accessible to the processing circuitry. These instructions, when executed by the processing circuitry, may cause the computing system to perform one or more of the functionalities described herein. As such, the computing system may comprise an entity capable of performing operations according to embodiments of the present disclosure while configured accordingly. Thus, for example, when the processing circuitry is embodied as an ASIC, FPGA or the like, the processor and, correspondingly, the computing system may comprise specifically configured hardware for conducting one or more operations described herein. Alternatively, as another example, when the processing circuitry is embodied as an executor of instructions, such as may be stored in the memory, the instructions may specifically configure the processing circuitry and, in turn, the computing system to perform one or more algorithms and operations described herein.

The memory may include, for example, volatile and/or non-volatile memory. The memory may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory may comprise any non-transitory computer readable storage medium. The memory may be configured to store information, data, applications, instructions, or the like for enabling the computing system 20 to carry out various functions in accordance with example embodiments of the present disclosure. For example, the memory may be configured to store program instructions for execution by the processing circuitry.

Regardless of the manner in which the computing system 20 is configured, the computing system, such as the processing circuitry, may be configured to to generate a weight distribution map of the supply 12 of composite material based upon the signals captured by the detector 18 following propagation through the different portions of the composite material. As the signals that are captured by the detector are dependent upon, such as inversely proportional to, the density of the composite material through which the signals propagated with more dense portions of the composite material absorbing a greater percentage of the electromagnetic signals and permitting a smaller percentage of the electromagnetic signals to propagate therethrough for capture by the detector and less dense portions of the composite material absorbing a smaller percentage of the electromagnetic signals and permitting a greater percentage of the electromagnetic signals to propagate therethrough for capture by the detector, the density of a respective portion of the composite material associated with an element of detector may be determined by the computing system and utilized to generate the weight distribution map.

The computing system 20 may be configured to not only determine the density based upon the magnitude of the signals provided by the detector 28, but to also associate the density with a respective portion of the supply 12 of composite material. In the lengthwise direction, the computing system may be configured to determine the respective portion of the supply of composite material through which the electromagnetic signals propagated based upon, for example, the extent of the advancement of the sheet of composite material from the supply at the time at which the sheet of composite material was irradiated, such as based upon communication between the supply of composite material, the source 16 of electromagnetic signals and the computing system. In the widthwise direction, the computing system may be configured to may be configured to determine the respective portion of composite material through which the electromagnetic signals propagated based upon the element of the detector, such as the element of the CCD linear detector 46, that captured the electromagnetic signals since each element of the detector is aligned with a respective portion of the composite material in the widthwise direction. Thus, the computing system may be configured to determine the density of each of the different respective portions of the sheet of composite material. By converting the density of each of the different respective portions of the sheet of composite material to a corresponding weight, such as by reference to a predetermined lookup table that associates density and weight measurements, the computing system may generate a weight distribution map of the supply of composite material. As such, the weight distribution map may be a multi-dimensional, such as a two-dimensional or three-dimensional, weight distribution map.

As shown in FIG. 5, for example, the density across the width of the composite material at one location along the length of the composite material is depicted. As shown, the density varies across the width of the composite material relative to a target density value 60, e.g., the nominal density value of the supply 12 of composite material. Similarly, the density may vary along the length of the composite material. Thus, as the supply of composite material is advanced, such as by the conveyor 14, past the source 16 of electromagnetic signals and the corresponding detector 18, the composite material may be repeatedly irradiated with electromagnetic signals and the detector may repeatedly capture the signals that propagate through the composite material such that the density in a widthwise direction at each of a plurality of locations along the length of the supply of composite material may be determined. The computing system of this example embodiment 20 may convert the signals received by the elements of the detector, such as the elements of the CCD linear detector 46, into density and, in turn, the weight of the sheet of composite material at each of the plurality of locations along the length of the supply of composite material, thereby generating the weight distribution map.

By way of further example, FIG. 6 depicts a three-dimensional weight distribution map 70. As shown, the three-dimensional weight distribution map 70 illustrates the density across the width of the composite material and along the length of the composite material. In this regard, the three-dimensional weight distribution map of FIG. 6 includes a plurality of two-dimensional weight distribution profiles 72 across the width of the composite material at a respective location along the length of the composite material. One example of a two-dimensional weight distribution profile 74 across the width of the composite material at a respective location along the length of the composite material is shown graphically above the three-dimensional weight distribution map 70. As represented by the weight distribution maps, the density of the composite material may vary along both the length of the composite material and across the width of the composite material, with the variations in the density correspondingly impacting the resulting weight of composite parts cut from the supply 12 of the composite material.

As shown in FIG. 1, the system 10 may also include a cutter 22, such as a flat bed cutter, positioned downstream in the lengthwise direction in which the supply 12 of composite materials advanced by the conveyor 14 in order to cut pieces of composite material, such as rectangular or other shaped pieces of composite material, from the supply of composite material. See block 32 of FIG. 2. Based upon the weight distribution map, the computing system 20 may be configured to determine the weight of each of the plurality of pieces of composite material cut from the supply of composite material. For example, the cutter may be configured to cut pieces of composite material having one or more predefined shapes and sizes. For each piece of composite material cut from the supply of composite material, the computing system may determine the weight of the respective pieces of composite material based upon the weight distribution map. In this regard, even though the cutter may cut pieces of composite material having the same size and shape, the weight of the different pieces of composite material may vary depending upon variations in the weight distribution map of the supply of composite material from which the pieces of composite material are cut. Alternatively, the computing system may be configured to control the cutter in order to cut pieces of composite material having a predefined weight. In this regard, the computing system may determine the size, shape and location of the pieces of composite material to be cut from the supply of composite material such that the resulting pieces of composite material have the predefined weight and may accordingly instruct the cutter to cut the pieces of composite material having the size, shape and location that have been determined.

The plurality of pieces of composite material may then be combined to form a resulting part. For example, a tray or other form may be provided that defines the shape and size of the resulting composite part. As such, a plurality of pieces of composite material may be placed in the tray or other form and then consolidated, such as by the application of heat and pressure, to form the resulting composite part. The composite part may have predefined weight requirements, such as a predefined acceptable range of weights defined by a minimum acceptable weight and a maximum acceptable weight. In order to satisfy the predefined weight requirement of the resulting composite part, the computing system 20 may be configured to determine, e.g., select, the pieces of composite material that are to be placed in the tray or other form to form the resulting composite part based upon the weight of the pieces of composite material. See block 34 of FIG. 2.

By way of example, FIG. 7 depicts a portion of a supply 12 of composite material that has been cut so as to define a plurality of pieces 80. The plurality of pieces may be of the same or different sizes. The plurality of pieces may be combined to form the composite part 82, such as by being placed in a tray 84 that defines the shape and size of the composite part. In FIG. 7, only a few pieces are shown within the tray for purposes of illustration with the composite part being formed of a plurality of pieces placed one upon another within the tray. Various composite parts may be formed including, for example, window trim for an aircraft or other vehicle.

Since the weight of the plurality of pieces of composite material is known in advance of the formation of the composite part, the pieces of composite material may be selected such that the sum of the weights of the pieces of composite material satisfy the predefined weight requirement of the resulting composite part, thereby streamlining and increasing the efficiency with which the composite part is fabricated. In order to facilitate the selection of pieces of composite material having an appropriate weight, the system of an example embodiment may include a plurality of bins for receiving and temporarily storing pieces of composite material, thereby defining a plurality of groups of pieces of composite material with each group having a different weight. Each bin may be associated with pieces of composite material having a predefined weight. Thus, pieces of composite material may be selected from the various bins based upon their respective weights such that the weight of the resulting composite part satisfies the predefined weight requirements. By selecting the pieces of composite material in the first instance such that the sum of the weights of the pieces of composite material satisfy the predefined weight requirement of the resulting composite part, the system and method of an example embodiment may avoid the time consumed by prior processes that required that the plurality of pieces of composite material that have been placed in the tray be weighed with pieces of composite material then being added or removed in an effort to satisfy the predefined weight requirement prior to again weighing the plurality of pieces of composite material that have been placed in the tray and then repeating the process, if necessary.

Prior to operation, the system 10 of an example embodiment may be calibrated. In this example embodiment, two or more samples of composite material having predefined densities may be provided. For example, a first sample having 0% density, a second sample having 50% density and a third sample having 100% density may be provided. Each sample may be individually irradiated and the signals that propagate through the respective sample may be captured by the detector 18. The computing system 20 may then determine the density of each sample and the density determined by the computing system may be compared to the predefined density of the samples. If the density determined by the computing system is equal to or within a predefined range of the predefined density of the samples, the system is considered properly calibrated and normal usage may commence. However, if density determined by the computing system is outside the predefined range of the predefined density of the samples, one or more system parameters may be adjusted and the calibration process may be repeated. While various system parameters may be adjusted, the energy level of the electromagnetic signals with which the composite material is irradiated may be adjusted, the gain and/or offset of the detector, such as provided by amplifier 54 may be adjusted, or the like.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method comprising:
   generating a weight distribution map of a supply of composite material, wherein generating the weight distribution map comprises determining a density of different portions of the supply of composite material based upon electromagnetic signals that have been captured following propagation through the supply of composite material during which at least some of the electromagnetic signals are absorbed by the composite material in a manner proportional to the density of the composite material, wherein determining the density comprises causing electromagnetic signals provided by a source on a first side of the composite material to impinge upon the first side of the composite material and detecting electromagnetic signals that have propagated through the composite material and emerged from a second side of the composite material with a detector on the second side, opposite the first side, of the composite material, wherein determining the density further comprises determining variations in the density both across a width and along a length of the supply of composite material, and wherein generating the weight distribution map further comprises converting the density of the supply of composite material to a weight of different portions of the supply of composite material;

cutting a plurality of pieces of composite material from the supply with a weight of each piece determined based upon the weight distribution map; and determining the plurality of pieces of composite material to be combined to form a composite part based upon the weight of each of the plurality of pieces of composite material such that a weight of the composite part satisfies a predefined weight requirement.

2. A method according to claim 1 wherein determining the density comprises:

exposing the supply of composite material to electromagnetic signals.

3. A method according to claim 1 wherein generating the weight distribution map comprises generating a multi-dimensional weight distribution map of the supply of composite material.

4. A method according to claim 1 further comprising defining the pieces of composite material to be cut from the supply based upon the weight distribution map and the predefined weight requirement of the composite part into which the pieces of composite material will be combined.

5. A method according to claim 1 further comprising sorting the plurality of pieces of composite material into groups based upon the weight of the pieces, wherein determining the plurality of pieces of composite material to be combined to form the composite part comprises selecting the plurality of pieces from one or more groups such that the weight of the composite part satisfies a predefined weight requirement.

6. A system for cutting pieces of composite material from a supply of composite material, the system comprising:

a source of electromagnetic signals configured to impinge upon the supply of composite material;

a detector configured to capture the electromagnetic signals following propagation through the supply of composite material during which at least some of the electromagnetic signals are absorbed by the composite material in a manner proportional to the density of the composite material; and a computing system configured to generate a weight distribution map of the supply of composite material based upon the electromagnetic signals captured following propagation through the supply of composite material such that a weight of each of a plurality of pieces of composite material cut from the supply of composite material and combined into a composite part is determinable, wherein the computing system is configured to generate the weight distribution map by determining a density of different portions of the supply of composite material based upon the electromagnetic signals that have been captured following propagation through the supply of composite material during which at least some of the electromagnetic signals are absorbed by the composite material in a manner proportional to the density of the composite material, wherein determining the density comprises causing electromagnetic signals provided by the source on a first side of the composite material to impinge upon the first side of the composite material and detecting electromagnetic signals that have propagated through the composite material and emerged from a second side of the composite material with the detector on the second side, opposite the first side, of the composite material, wherein the computer system is also configured to determine the density by determining variations in the density both across a width and along a length of the supply of composite material, and wherein generating the weight distribution map further comprises converting the density of the supply of composite material to a weight of different portions of the supply of composite material.

7. A system according to claim 6 wherein the computing system is configured to generate the weight distribution map by generating a multi-dimensional weight distribution map of the supply of composite material.

8. A system according to claim 6 wherein the computing system is further configured to define the pieces of composite material to be cut from the supply based upon the weight distribution map and a predefined weight requirement of the composite part into which the pieces of composite material will be combined.

9. A system according to claim 6 wherein the computing system is further configured to determine the weight of each piece of composite material cut from the supply such that the plurality of pieces of composite material are sortable into groups based upon the weight of the pieces.

10. A system according to claim 6 wherein the source of electromagnetic signals comprises:

a source of x-ray signals configured to generate a two-dimensional x-ray fan beam; and a filter configured to narrow an energy spectrum of the x-ray fan beam prior to impingement upon the supply of composite material.

11. A system according to claim 6 wherein the electromagnetic signals are x-ray signals, and wherein the detector comprises:

an x-ray scintillator configured to receive x-ray signals following propagation through the supply of composite material and to generate corresponding light signals; and a charge coupled device linear detector configured to receive the light signals from the x-ray scintillator and to provide corresponding signals to the computing system representative of the density of different portions of the supply of composite material.

12. A system for cutting pieces of composite material from a supply of composite material, the system comprising:

a conveyor configured to advance the supply of composite material;

a source of x-ray signals configured to impinge upon the supply of composite material as the supply is advanced by the conveyor;

a detector configured to capture the x-ray signals following propagation through the supply of composite material during which at least some of the x-ray signals are absorbed by the composite material in a manner proportional to the density of the composite material;

a computing system configured to generate a weight distribution map of the supply of composite material based upon the x-ray signals captured by the detector, wherein the computing system is configured to generate the weight distribution map by determining a density of different portions of the supply of composite material based upon x-ray signals that have been captured following propagation through the supply of composite material during which at least some of the x-ray signals are absorbed by the composite material in a manner proportional to the density of the composite material, wherein determining the density comprises causing x-ray signals provided by the source on a first side of the composite material to impinge upon the first side of the composite material and detecting x-ray signals that have propagated through the composite material and emerged from a second side of the composite material with the detector on the second side, opposite the first side, of the composite material, wherein the computing system is also configured to determine the density by determining variations in the density both across a width and along a length of the supply of composite material, and wherein generating the weight distribution map further comprises converting the density of the supply of composite material to a weight of different portions of the supply of composite material; and a cutter configured to cut pieces of composite material from the supply of composite material for subsequent combination into a composite part having a weight that satisfies a predefined weight requirement.

13. A system according to claim 12 wherein the computing system is configured to generate the weight distribution map by generating a two-dimensional weight distribution map of the supply of composite material.

14. A system according to claim 12 wherein the computing system is further configured to define the pieces of composite material to be cut from the supply based upon the weight distribution map and the predefined weight requirement of the composite part into which the pieces of composite material will be combined, and wherein the cutter is responsive to the computing system so as to cut the pieces of composite material from the supply of composite material in a manner defined by the computing system.

15. A system according to claim 12 wherein the computing system is further configured to determine the weight of each piece of composite material cut from the supply of composite material by the cutter such that the plurality of pieces of composite material are sortable into groups based upon the weight of the pieces.

16. A system according to claim 12 wherein the source of x-ray signals is configured to generate a two-dimensional x-ray fan beam, and wherein the system further comprises a filter configured to narrow an energy spectrum of the x-ray fan beam prior to impingement upon the supply of composite material.

17. A system according to claim 12 wherein the detector comprises:
    an x-ray scintillator configured to receive x-ray signals following propagation through the supply of composite material and to generate corresponding light signals; and
    a charge coupled device linear detector configured to receive the light signals from the x-ray scintillator and to provide corresponding signals to the computing system representative of the density of different portions of the supply of composite material.

18. A method according to claim 1 wherein determining the density of different portions of the supply of composite material further comprises determining the density of different portions of the supply of composite material based upon x-ray signals that have been captured following propagation through the supply of composite material during which at least some of the x-ray signals are absorbed by the composite material in a manner proportional to the density of the composite material.

19. A method according to claim 1 further comprising advancing the composite material upon a conveyor, and wherein detecting electromagnetic signals that have propagated through the composite material comprises detecting electromagnetic signals that have propagated through both the composite material and the conveyor.

20. A method according to claim 1 further comprising advancing the composite material upon a conveyor that defines a gap, and wherein causing electromagnetic signals to impinge upon the first side of the composite material comprises causing electromagnetic signals provided by the source to impinge upon that portion of the composite material that bridges the gap defined by the conveyor such that the electromagnetic signals detected by the detector have not propagated through the conveyor.

* * * * *